April 27, 1948.  E. K. BROWN  2,440,435
DOUBLE ROW ANTIFRICTION BEARING
Filed Sept. 6, 1945  2 Sheets-Sheet 1
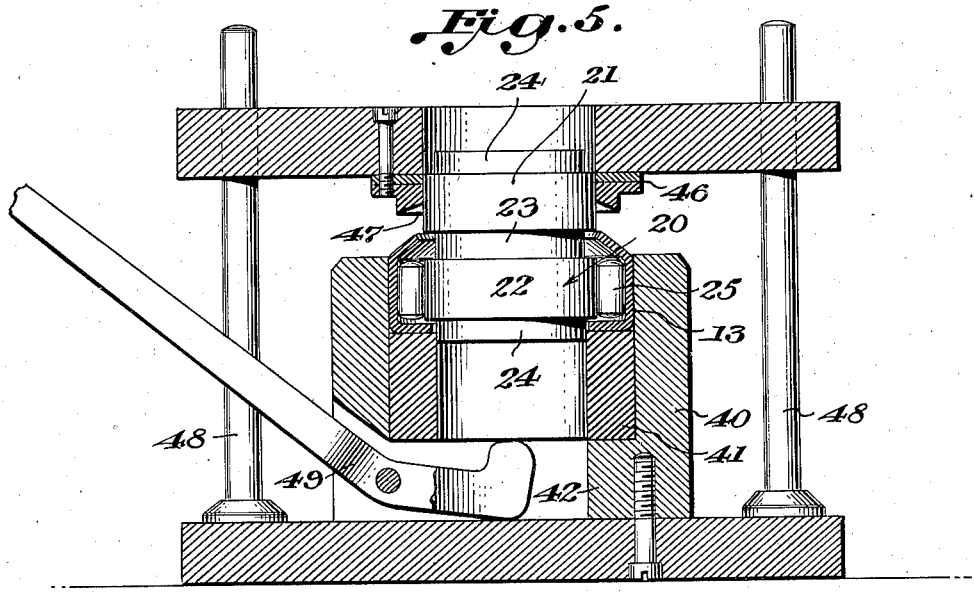
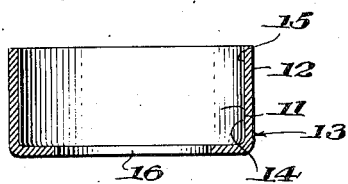
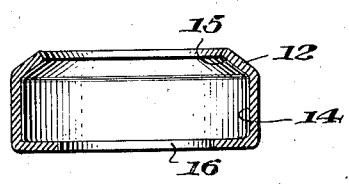
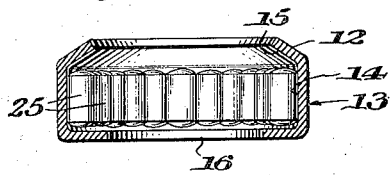
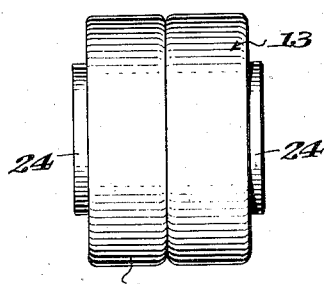
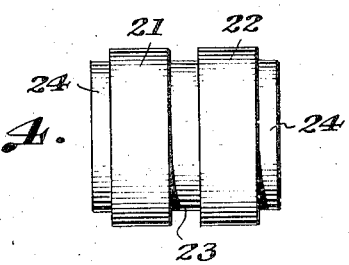
Inventor,
Edmund K. Brown,
Mason, Porter & Diller,
attys.

April 27, 1948. E. K. BROWN 2,440,435
DOUBLE ROW ANTIFRICTION BEARING
Filed Sept. 6, 1945 2 Sheets-Sheet 2

Inventor,
Edmund K. Brown,
Mason, Porter & Diller,
By Attys.

UNITED STATES PATENT OFFICE 2,440,435

DOUBLE ROW ANTIFRICTION BEARING

Edmund K. Brown, Torrington, Conn., assignor to The Torrington Company, Torrington, Conn., a corporation of Connecticut Application September 6, 1945, Serial No. 614,669

3 Claims. (Cl. 308—213)

In employing antifriction bearings, it is desirable to distribute the load along the axis and to assure the maintenance of rotation about the selected axis. When single-row bearings are used, there is very poor resistance to an external couple. When roller bearings are used, such as needle bearings which have high length-to-diameter ratios, the use of a single bearing for a pulley, gear, etc., causes trouble due to corner-loading of the rolls. For continuous successful operation of needle bearings, the rolls should have an unloaded zone; that is, the rolls at one side of the bearing must be free for the entire length to move and realign themselves; and to obtain this condition there can be no pressure from the outer race through the roll to the inner race at this zone.

If a single row cylindrical roller bearing, of needle type for example, is subjected to an external couple load, a relative angular movement between the axes of the inner and outer races causes the roll at one side of the bearing to be loaded at one end and the roll at the opposite side to be loaded at the other end. This loading at the ends causes skewing of the individual rolls; and the binding of the opposite rolls prevents realignment, so that the bearing either creates high end thrust within itself or locks up. Hence, the employment of two axially spaced rows of rolls is advisable, so that an external couple will be resisted by one bearing at one end of the pulley, etc., and by the other bearing at the other end, thereby providing an unloaded zone in each bearing.

In my Patents 2,038,474 and 2,038,475 are described cylindrical roll or needle bearing units composed of rollers and one-piece race cups having flanges for retaining the rolls so that the assemblies can be handled and installed as units. It is feasible to employ a pair of such units, but for quick and accurate assembly of parts, it is desirable to have single-unit devices.

A feature of this invention is the provision of a single-unit structure having two rows of bearing rolls.

Another feature is the provision of a single-unit structure having two rows of bearing rolls, together with included inner races and outer races therefor, and partition means for preventing endwise interfering movement of the rows of rolls.

Other features will appear in the course of the following description and claims.

An illustrative form of practice is shown on the accompanying drawings, in which:

Figure 1 shows a cup structure for providing an outer race.

Figure 2 shows the cup with its lip in frusto-conical form.

Figure 3 shows a cup as in Figure 2 with rolls assembled therein.

Figure 4 shows an inner race member.

Figures 5 and 6 show the operation of seating the cup and roll assembly of Figure 3 with an inner race member of Figure 4.

Figure 8 is a view showing the completed bearing unit.

Figure 6:
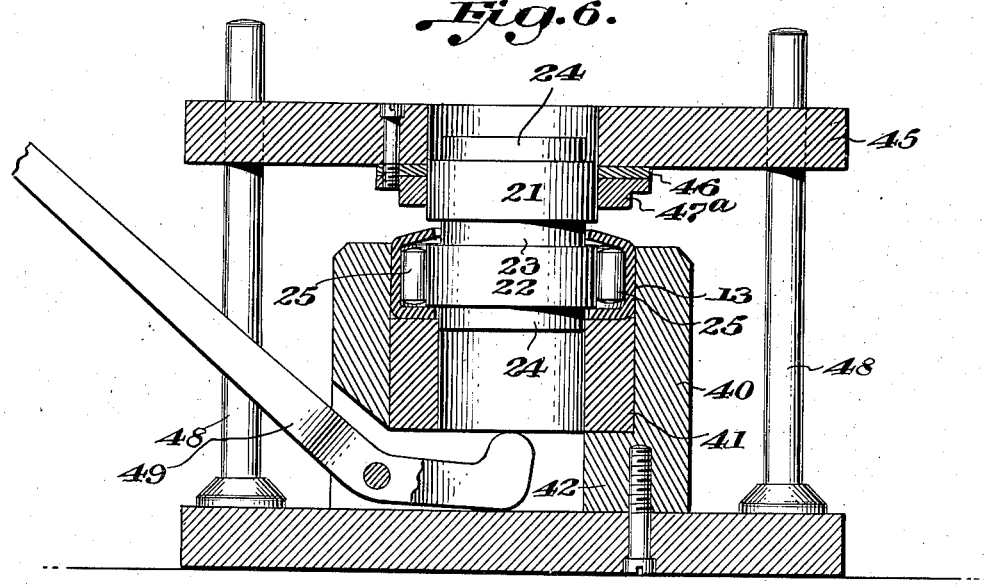

Figure 1 shows a cup which can be made in various conventional ways by turning, spinning, drawing and forming in dies. The cup 11 (Figure 1) is thus formed with a thinned section at its upper open end or lip; and then by further operations the lip is brought inward to a frusto-conical form 12 (Figure 2) so that the structure 13 has a general cylindrical inner surface 14 of predetermined diameter and length, and a mouth 15 at the small end of the conic frustum which likewise is of predetermined size for barely permitting passage of the inner race member. During these operations, also, an aperture 16 is formed in the bottom of the cup, of a diameter smaller than the inner race surface, thereby providing a flange for detaining the bearing rolls.

An inner race member 20 (Figure 4) is formed, for example, by turning from a bar, to provide two spaced cylindrical inner race surfaces 21, 22 which are usually of equal size and provide the largest diameter of the member. Between these is a groove 23 of lesser diameter and having an axial dimension slightly greater than the combined thicknesses of two of the conic frustra 12, after these have been pressed so as to extend into and engage in the inner race. This groove provides shoulders at the proximate ends of the cylindrical surfaces. At each end is a reduced portion 24 of diameter slightly smaller than the apertures 16, for likewise providing shoulders.

Cylindrical needle rolls 25 are formed of the desired length and diameter, usually with rounded or spherical ends to clear the fillets in the outer race. In the drawings, the diameter of the rolls 25 and the thickness of the outer race member have been exaggerated relative to the diameters of the races, as compared with perferred practice, for clearness of illustration of the shapes and relative positions of the parts. By design, the inner surface 14 is slightly greater in diameter than the inner race surfaces 21, 22 plus twice the diameter of the individual rolls; and its length is slightly greater than that of the individual rolls, e. g. 0.010 to 0.015 inch for a roller one inch long.

The cups, inner race members, and rolls are preferably formed of steel, and are then hardened and polished before assembly.

The parts may be assembled by placing a cup 13 on its base (Figure 3) and inserting rolls 25 in number sufficient to fill the periphery with a slight spacing.

An inner race member 20 is then introduced (Figure 5) until the reduced portion enters the aperture 15 and the adjacent shoulder on the inner race member rests on the bottom flange of the cup, while at the same time forcing the frusto conical flange 12 into a plane form so that its lip enters the groove 23, and therewith stressing the material beyond its elastic limit so that the engagement is maintained. A second outer race member with rollers is then similarly positioned at the other end of the inner race. This can be done by appropriate tools, such as the illustrative conventionalized press-die structures shown in Figures 5, 6 and 7.

In Figure 5 the die shoe supports a located ring 40 which closely receives the outer race structure so that the latter rests upon an anvil 41 formed as a knockout and supported against downward movement by a rest 42 shown as a part of the ring body. When the inner race member 20 is introduced, its lower shouldered surface rests against the bottom flange of the outer race member, so that the groove 23 lies opposite the lip of the outer race member. A punch holder 45 has a recess for closely receiving the upper surface 21 of the inner race member; and holds a pressure ring punch 47 which clears the inner race but engages the frusto-conical part of the outer race member. In operation, when the forming of the conical flange is being conducted in two steps, the effective lower surface of the ring 47 is a hollow cone having an angle of about 20 degrees relative to the radial plane. Aligning means, illustrated by the leader pins 48, is preferably provided to assure accurate control during the operation. The knocker 49 for ejecting the formed assembly serves to move the anvil or knockout 41 upwardly when the upper punch 45 is withdrawn.

An outer race assembly with its rolls or needles is inserted in ring 40 until it rests on the anvil 41 and the latter upon the rest 42. An inner race is introduced until it rests on the outer race flange. The punch holder 45 is brought down, and the pressure ring 47 begins to press the frustum downwardly. The ring 40 prevents bulging deformation of the cylindrical part of the outer race member during the operation of pressing the frusto-conical portion downward toward a radial plane position, wherewith its mouth diameter decreases, and the lip enters and interlocks in the groove 23. This pressing stresses the material beyond its elastic limit, so that it remains in this interlocked position. The effects are controlled by adjusting the positions occupied by the parts at the end of the press stroke, as by use of the shim or pad 46 with a press having a fixed ram stroke. Then the upper punch 45 is raised again, and the ejecting knocker 49 actuated to raise the partial assembly clear of the die, so that it can be removed.

Figure 7:
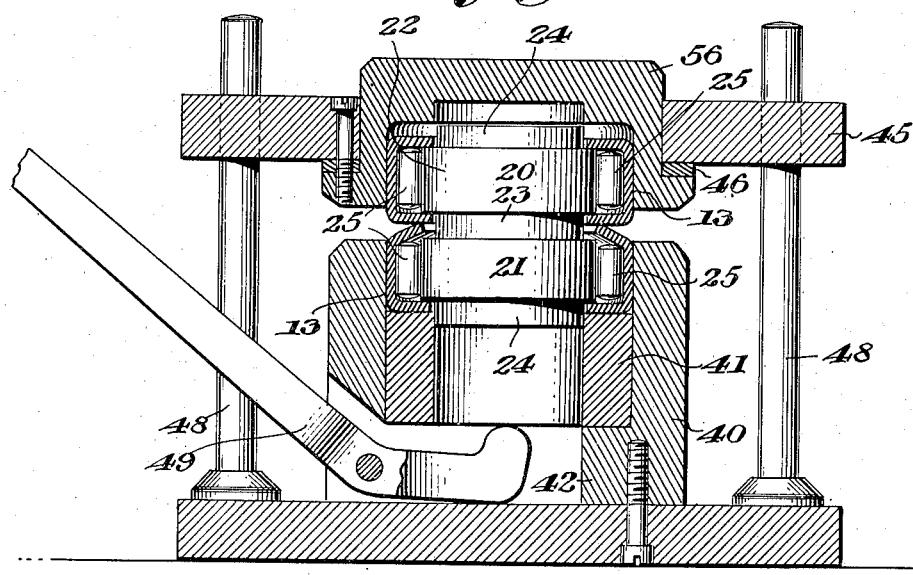
Figure 7 shows the assembly of a second cup and roll assembly of Figure 3 with the structure produced as in Figure 6.

The tools in Figures 6 and 7 have the ring 40, anvil 41, rest 42 and knocker 49 as in Figure 5.

When the two outer races for each unit are of the same size, the same die shoe structure can be employed in Figures 5, 6 and 7. The punch holder 45 of Figure 6 has a pressure punch 47a which has a plane lower face. The punch holder 45 of Figure 7, however, has a recess of larger size than the punch of Figure 5 in order to receive the already positioned outer race member of the structure coming from Figure 5: in the illustrative form a cap punch 56 bears upon this latter outer race, and preferably upon the end of the inner race. In Figure 7, the essentially plane flange of the already-positioned outer race member is employed as the tool for forming the flange for the second outer race member.

The partial assembly from Figure 5 is introduced to the tool of Figure 6, by inserting it in the ring 40 as before. The punch holder 45 is brought down, so that the punch 47a engages the partially re-shaped conical frustum, and presses this to plane form. The metal is again strained beyond the elastic limit, so that the upper flange remains "set" essentially as a plane, with a slight elastic return or recovery which provides end clearance relative to the inner race. This effect is controlled by adjustment of the final position of the punch holder 45 by suitable means such as the shim 46.

A second outer race assembly with its rolls or needles is introduced into the ring 40 of Figure 7 until it rests on the anvil 41. The partially-assembled unit from Figure 6 is inverted and its end introduced into the second outer race until the two outer race structures abut. This positions the lip of the second outer race member in plane with the groove 23. The punch holder 45 is brought down, and the frustum of the second outer race is similarly stressed beyond its elastic limit and caused to enter the groove 23 and interlock therewith. It will be noted that the already-formed flange of the first outer race member is being supported at its inner periphery by engaging the shoulder wall of the groove 23. When the upper punch 56 is raised, the flanges return slightly and provide the end clearance for the rolls. This completes the assembly and provides the unit as shown in Figure 8.

This unit has a solid inner race member and two individually movable outer race members spaced axially along the inner race so that the aforesaid troubles do not arise.

It is obvious that the illustrated form of practice is not restrictive, and that the invention may be utilized in other forms within the scope of the appended claims.

I claim:

1. A roller bearing structure comprising an inner race member having race surfaces each terminated at its ends by an inward shoulder, the proximate shoulders being spaced, a set of rolls on each said surface; and two outer race members each surrounding one of said sets of rolls, each outer race member having an integral flange extending inwardly for engaging the corresponding proximate shoulder and thereby preventing separation of the race members.

2. A roller bearing unit comprising a one-piece inner race member having two cylindrical race surfaces separated by a peripheral groove, two sets of rolls with one of said sets positioned on each of said cylindrical race surfaces, and two individual outer race members; each of said outer race members being of one-piece construction and having a cylindrical inner surface to cooperate with a corresponding one of said sets of rolls, also having an end flange extending inwardly at one end of the inner race for detaining the set of rolls against separation, and also having an end flange engaged in said peripheral groove; said outer race members being rotatable about the inner race member independently of each other.

3. A roller bearing unit comprising a one-piece inner race member having two cylindrical race surfaces separated by a peripheral groove, two sets of rolls, each of said cylindrical race surfaces having a said set of rolls thereon, and two individual outer race members, each surrounding a corresponding inner race surface and the set of rolls thereon; each of said outer race members being a one-piece cup structure with a cylindrical inner surface to cooperate with the corresponding one of said sets of rolls, and with the bottom of the cup extending inwardly at one end of the inner race member for detaining the set of rolls against separation, and also having at the other end of the cup a flange formed by bending the edge of the cup wall inwardly substantially into a radial plane with the free edge engaged in said peripheral groove, wherewith the two said bent flanges have their free edges in said groove; said outer race members being rotatable about the inner race member independently of each other.

EDMUND K. BROWN.

REFERENCES CITED

The following references are of record in the file of this patent:

UNITED STATES PATENTS

| Number | Name | Date |
| --- | --- | --- |
| 1,176,170 | Schatz | Mar. 21, 1916 |
| 1,995,571 | Lott | Mar. 26, 1935 |
| 2,268,745 | Frauenthal | Jan. 6, 1942 |
| 2,360,078 | Smith | Oct. 10, 1944 |
| 2,383,727 | Lewis | Aug. 28, 1945 |